(12) United States Patent
Sebille et al.

(10) Patent No.: US 8,360,257 B2
(45) Date of Patent: Jan. 29, 2013

(54) SCREW CAP, CONTAINER BODY AND CONTAINER

(75) Inventors: Vincent Sebille, Etampes (FR); Benoit Portier, Bourges (FR); Jacquy Lebon, Challands (FR); Valère Logel, Levallois Perret (FR)

(73) Assignee: Airsec S.A.S., Choisy le Roi (FR)

( * ) Notice: Subject to any disclaimer, the term of this patent is extended or adjusted under 35 U.S.C. 154(b) by 532 days.

(21) Appl. No.: 12/604,068

(22) Filed: Oct. 22, 2009

(65) Prior Publication Data

US 2010/0102020 A1  Apr. 29, 2010

(30) Foreign Application Priority Data

Oct. 24, 2008  (EP) .................................... 08018683

(51) Int. Cl.
 *B65D 55/02*  (2006.01)
 *B65D 41/04*  (2006.01)
 *B65D 53/00*  (2006.01)
 *B29D 1/00*  (2006.01)

(52) U.S. Cl. .......... 215/344; 215/44; 215/219; 215/220; 215/329; 215/330; 215/331; 215/337; 215/340; 220/288; 220/298; 220/304; 264/318

(58) Field of Classification Search .................. 215/44, 215/219, 220, 230, 329, 330, 331, 337, 340, 215/344; 220/288, 296, 298, 304; 264/318
See application file for complete search history.

(56) References Cited

U.S. PATENT DOCUMENTS

| 4,345,607 A | 8/1982 | Contreras et al. |
|---|---|---|
| 4,498,608 A | 2/1985 | Mercil |
| 4,589,431 A | 5/1986 | Yuhara |
| 4,834,234 A | 5/1989 | Sacherer et al. |
| 5,836,465 A | 11/1998 | King |
| 5,947,274 A | 9/1999 | Taskis et al. |
| 6,000,550 A | 12/1999 | Simpson et al. |
| 6,070,749 A | 6/2000 | Joulia |
| 6,177,041 B1 * | 1/2001 | Bietzer ................. 264/318 |
| 6,461,026 B1 | 10/2002 | Wang |
| 8,051,999 B2 * | 11/2011 | Carmody et al. ......... 215/330 |
| 2002/0074306 A1 * | 6/2002 | Krautkramer ............. 215/252 |

(Continued)

FOREIGN PATENT DOCUMENTS

| CA | 2107055 A1 | 8/1994 |
|---|---|---|
| CH | 309026 | 10/1955 |

(Continued)

OTHER PUBLICATIONS

English Translation of International Preliminary Report on Patentability pertaining to international application No. PCT/EP2008/056894.

*Primary Examiner* — Anthony Stashick
*Assistant Examiner* — Madison L Poos
(74) *Attorney, Agent, or Firm* — Scott R. Cox

(57) ABSTRACT

The invention relates to a screw cap (10) capable of being screwed onto the neck (44) of a container body (40), the screw cap comprising a substantially cylindrical screw section (17) comprising a screw thread (16) on its inner face, at least one tamper evidence member (18) for indicating an initial opening of the screw cap (10), and a desiccant chamber (24) located radially inwardly to the screw section, wherein the screw section (17) is radially resilient.

20 Claims, 8 Drawing Sheets

U.S. PATENT DOCUMENTS

| | | |
|---|---|---|
| 2003/0029739 A1 | 2/2003 | Riemenschneider et al. |
| 2004/0045923 A1* | 3/2004 | Lancesseur et al. .......... 215/220 |
| 2004/0065669 A1 | 4/2004 | Giraud et al. |
| 2007/0272646 A1 | 11/2007 | Lancesseur et al. |

FOREIGN PATENT DOCUMENTS

| | | |
|---|---|---|
| DE | 102005059675 | 6/2007 |
| EP | 0454967 A2 | 11/1991 |
| EP | 0824480 B1 | 2/1998 |
| EP | 1352844 A1 | 10/2003 |
| EP | 1616810 A1 | 1/2006 |
| FR | 1159823 | 2/1958 |
| GB | 248223 | 3/1926 |
| GB | 769054 | 2/1957 |
| GB | 812580 | 4/1959 |
| GB | 2265890 A | 10/1993 |
| WO | WO8908057 A1 | 9/1989 |
| WO | WO9850283 A1 | 11/1998 |
| WO | WO0126973 A2 | 4/2001 |
| WO | WO2004094257 A1 | 11/2004 |
| WO | WO2004096658 A1 | 11/2004 |
| WO | WO2006037135 A1 | 4/2006 |

\* cited by examiner

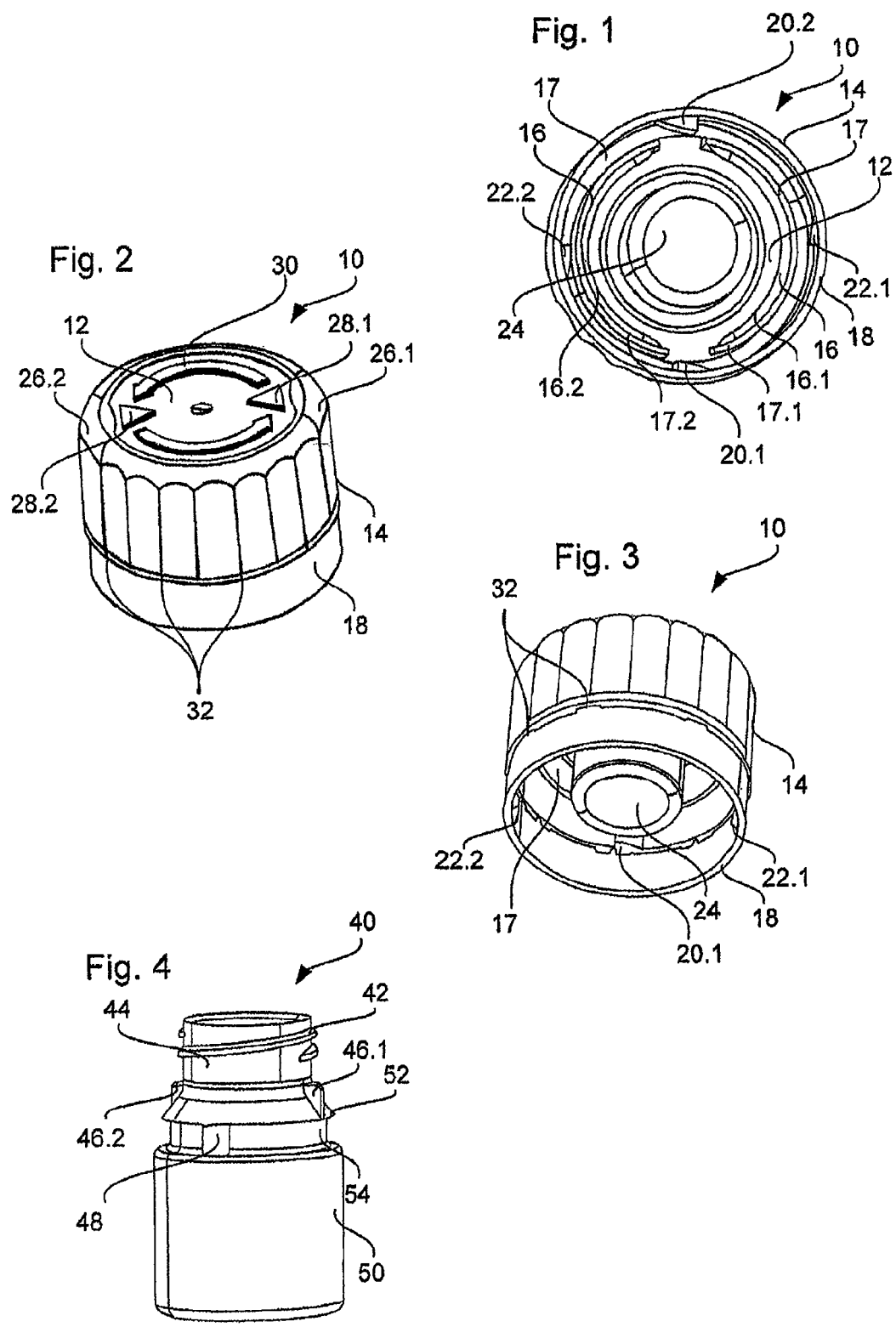

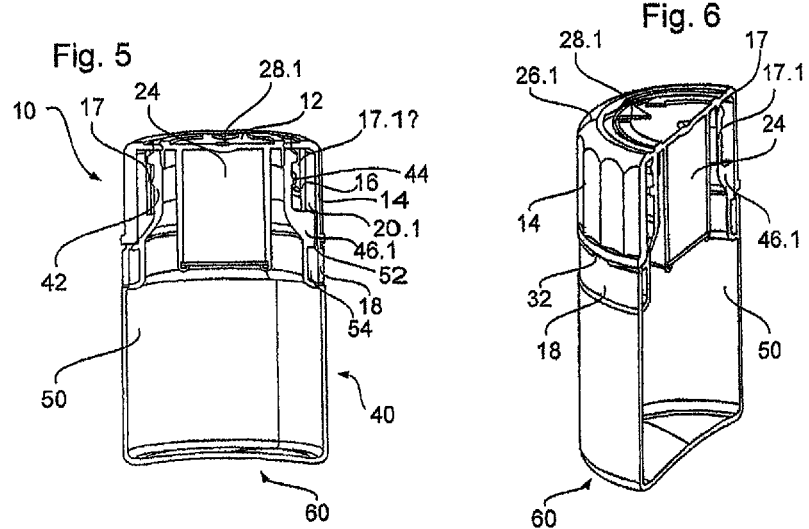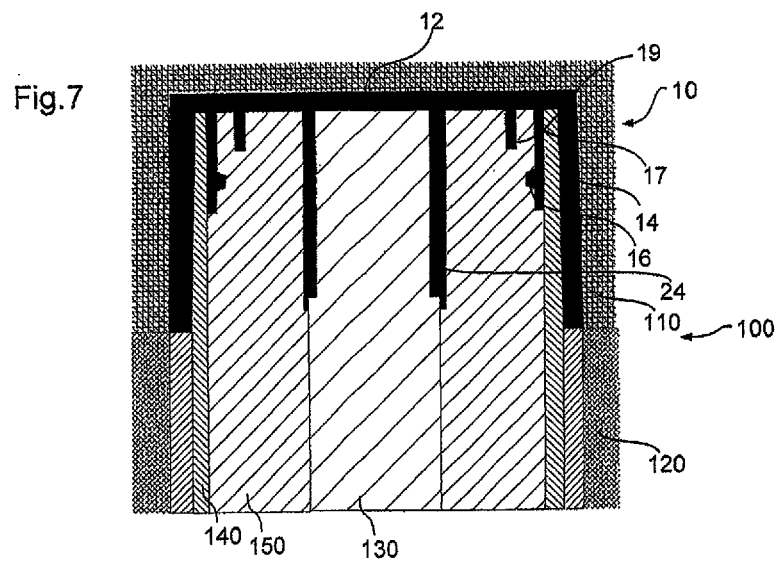

140

17
16
150

130

INVENTION | PRIOR ART

24

Fig. 14
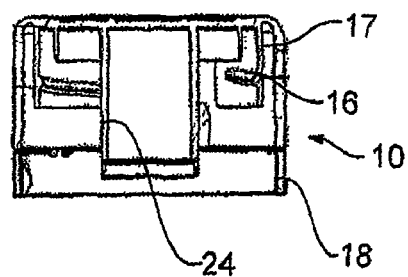
Fig. 15
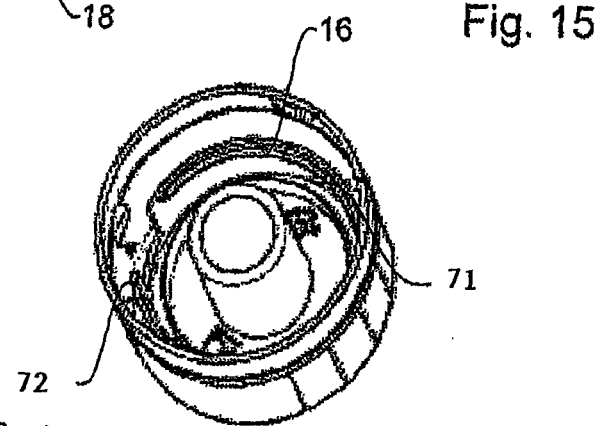
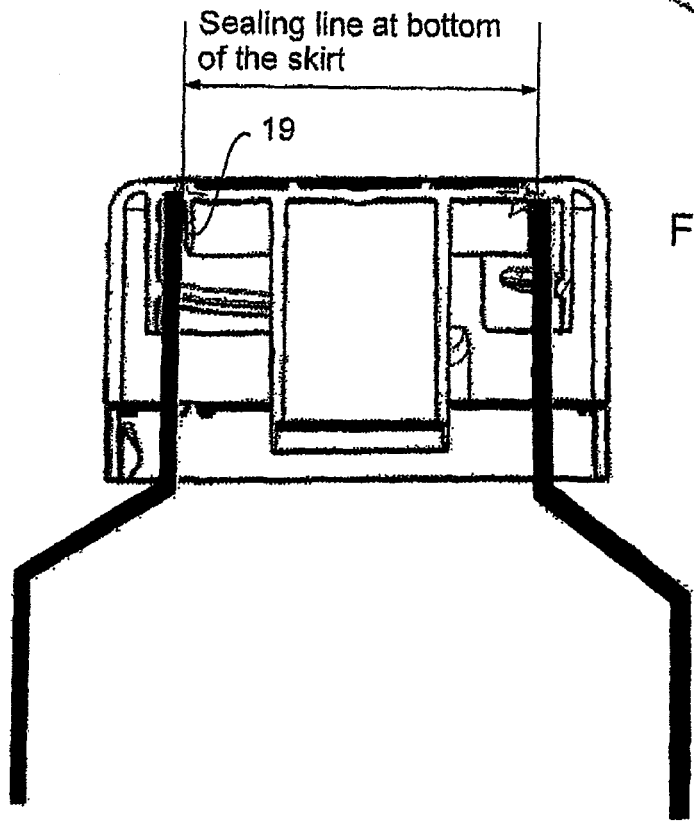
Fig. 16

SCREW CAP, CONTAINER BODY AND CONTAINER

TECHNICAL FIELD

The invention relates to a screw cap capable of being screwed onto the neck of a container body, to a container body, to a container including the screw cap and to a method for fabricating the screw cap.

TECHNICAL BACKGROUND

Closures having a tamper indicating band which is detached from the closure after its first removal from a container are known in the prior art.

WO 98/50283, for example, describes a child resistant closure which is, on the one hand, childproof and, on the other hand, comprises a tamper indicating element. This prior art document shows a screw cap which, in the closed state, can only be turned when squeezing two diametrical faces of the cap such that the cap is deformed and the child resistant locking mechanism is overridden. The locking mechanism described in this document comprises two protrusions pointing outwardly from the neck of the container and two further protrusions pointing inwardly from an inside face of the screw cap. The tamper indicating member which is connected to the screw cap by a couple of webs is separated from this screw cap upon an initial turn of the cap due to the actual axial movement of the cap because the tamper indicating member is axially restrained.

This screw cap of the prior art comprises an integral full thread, the manufacturing of which is complex and time consuming because a separate moulding insert/element for forming the thread needs to be removed from the finished product during demoulding by un-screwing it.

SUMMARY OF THE INVENTION

It is an object of the present invention to provide a screw cap for a container according to the above technical field which provides for an effective and fast manufacturing process.

A solution to this technical problem is provided by a screw cap according to claim 1.

Accordingly, the screw cap capable of being screwed onto the neck of a container body comprises a substantially cylindrical screw section comprising a screw thread on its inner face, at least one tamper evidence member for indicating an initial opening of the screw cap and a desiccant chamber located radially inwardly to the screw section, wherein the screw section is radially resilient.

Having such a desiccant chamber, the screw cap provides an element which is particularly useful for containers housing hydrophobic or water sensitive substances such as powders or medicals. A screw cap having a desiccant chamber in it makes a further desiccant chamber in the container body unnecessary. The desiccant chamber could be used to contain any active material for protecting the goods contained in a container. The function of the desiccant chamber is to hold an active ingredient within the hollow space formed by the desiccant chamber between the inner surface of the front circular wall of the cap and a retaining membrane on the opposite side for closing the chamber.

In the context of this application the term "radially resilient" is to be understood in the sense that the screw section can be radially expanded to the outside, or radially compressed to the inside by a certain amount when a force is applied. After the force has been removed, the screw section returns into its original shape, without being damaged.

This radial resiliency of the screw section provides several advantages, in particular with respect to the solution to the above-mentioned objective. The radial resilience enables the screw cap to be manufactured without using a so called "screw-insert" in the mould which was typically used in the art in order to form a screw thread.

The radial resilience has the advantage of enabling a demoulding process which uses the forcible ejection of the screw cap from the mould, without the necessity of using any turning parts of the mould. This has the additional advantage that the mould can be provided in a rather compact form, leading to lower cost, lower cycle time and a higher flexibility.

Different embodiments enable the provision of a resilient screw section, as will be shown in the following. In particular, a specific dimensioning of the screw section such as to achieve the radial resiliency is one of the possibilities.

Furthermore, in order to improve the resilience, a peripheral wall could be provided wherein the screw section is then situated on a separate screw skirt situated radially outwardly of the desiccant chamber and radially inwardly of the peripheral wall of the screw cap.

In yet another embodiment, the screw skirt comprises at least two distinct skirt sections in order to provide for the resilience of the screw section.

As a further option, the screw thread may be provided by means of at least two distinct thread sections such as to provide for an increased resiliency of the screw section as the thread itself tends to hamper the resiliency of the screw section. The combination of all the separate thread sections forms a thread for the screw cap whereas the thread sections are not united with each other. In order to achieve a secure and convenient thread, it is preferred that the individual portions have a respective counter portion being arranged in a substantially diametrically opposed manner, namely on the other side of the inside face of the screw section of the screw cap. That means that if there are two thread sections, these thread sections are substantially opposed to one another, if there are four thread sections, each of these thread sections has another thread section being diametrically opposed to it. In case of an odd number of thread sections, e.g. three thread sections, these are preferably arranged such that the centre position of each of the thread sections is substantially diametrically arranged to the angular centre of two opposed thread sections.

In yet another embodiment, the cross-section of the thread on the screw section is designed such that it supports a forcible ejection of the cap from a mould, in particular a cross-section that reduces the counter-force generated by the undercut of the thread when the cap is forcibly ejected from a mould in a linear manner.

All solutions pertaining to the resilience of the screw section have the advantage that the resilience makes the un-screwing of a moulding insert unnecessary.

In another preferable embodiment the screw further comprises at least one childproof locking member including a first locking section, wherein the tamper evidence member comprises at least one second locking section, and the first locking section and the second locking section are angularly separated from one another. Preferably, the childproof locking member comprises at least two first locking protrusions which are substantially diametrically arranged and/or the tamper evidence member comprises at least two second locking sections which are substantially diametrically arranged. In a preferred embodiment, the first and second locking sections are arranged at an angular separation of 15°-155°, more preferably of 45°-135°, most preferably of 80°, 90° or 110°.

This angular separation of the first and second locking sections accounts to the deformation of the screw cap. The screw cap is constructed such that an inward radial deformation at a second angular position corresponds to an outward radial deformation at a first angular position. The angular separation of the first and second angular positions is preferred to be in the above mentioned ranges. Preferably, inwardly deforming the screw cap at a second angular position results in outwardly deforming the screw cap at a first angular position which first angular position is separated by about 90° from the second angular position.

However, the screw cap can be constructed such that the angular separation of these positions can differ by 90°. However, in order to improve the ease of opening the cap, it is preferred using an angular separation of 80° or 100° such that the tamper evidence member comes into contact with the respective counter member before the childproof locking sections of the child resistance mechanism come into contact with their respective counterparts on the container neck. Accordingly, the tamper evidence member is destroyed and opened before the childproof locking sections are in contact with their respective counterparts. This has the advantage that the force that needs to be applied to open the container can be applied sequentially, first to open the tamper evidence member and then to overcome the childproof locking sections. In other words, the childproof locking sections come into locking engagement after having turned the cap by a small angle such as e.g. 5°-20° after having destroyed the tamper evidence member.

The screw cap having two first locking sections is more reliably protected from being opened by a child. The diametrical arrangement of the two first locking sections implies that the locking sections, which are preferably formed by two first protrusions inwardly protruding from the inner surface of a peripheral wall of the screw cap, is particularly useful because an inward radial deformation at a second angular position corresponds to an outward radial deformation at a first angular position wherein the first and second angular positions are alternating and angularly separated by about 90° (or 80° or 100° as discussed above). Therefore, diametrically arranged first locking sections can be moved outwardly by inwardly radially deforming the screw cap at a second angular position, in particular by pressing two opposed faces of the peripheral wall at the second angular positions towards each other.

Advantageously, the tamper evidence member is axially attached to the peripheral wall by one or more frangible webs and the tamper evidence member preferably is a tamper evidence ring. Being axially attached to the peripheral wall means that the tamper evidence member is attached in the direction of an axis of the cylinder of the screw section. When the tamper evidence member is a tamper evidence ring, this ring preferably is of the same diameter as the peripheral wall of the screw cap and attached to the screw cap substantially as an axial extension of the peripheral wall.

The tamper evidence member preferably has at least two second locking sections which are substantially diametrically arranged. Proving two second locking sections increases the reliability of the tamper evidence member since one locking section locks the tamper evidence member even when the second of the second locking sections does not lock the tamper evidence member. As to the substantially diametrical arrangement of the two second locking sections, this embodiment is preferred because the two second locking sections lock upon an inward deformation of the screw cap which preferably is achieved by pressing diametrically arranged faces of the screw cap towards the centre of the screw cap.

Therefore, a diametrical arrangement of the locking sections provides for best locking results.

It is further preferred that the first angular position of the outward radial deformation corresponds to the angular position of the first locking sections. In this case, the outward radial deformation can unlock the first locking sections overriding the childproof lock and enabling the user to open the screw cap. However, also slight angular deviations from the first angular position can be used as angular position of the first locking sections.

Further, it is preferred that the second angular position corresponds to the angular position of the second locking sections. Since the second angular position corresponds to the angular position of the inward radial deformation, such deformation locks the second locking section and, accordingly, activates the tamper evidence member when the screw cap is turned.

Further, in a preferred embodiment, the screw cap is an integrally formed element. Due to the above mentioned features of the screw cap, it is possible to integrally form the screw cap as a single element or a single piece. This provides for low costs in manufacturing of the screw cap and facilitates fabrication of it.

In order to improve the guidance of the screw cap during the demoulding process, the inequation $d2>d1$, in particular $d2>=0.8\times d1$, is valid, provided $d2$ is the axial length of the desiccant chamber and $d1$ is the axial distance between the outmost thread portion and a circular front wall section of the cap. In this specific embodiment, the desiccant chamber extends beyond the outermost portion of the thread, leading to a reliable and strong guidance of the cap during demoulding. In particular, a tilting or twisting of the cap is suppressed during demoulding, even if the cap is forcibly ejected from the mould.

The sealing performance can be highly improved by providing a sealing skirt situated radially inwardly of the screw section and radially outwardly of the desiccant chamber.

In order to further improve the sealing performance, at least one spacer situated between the screw section and the sealing skirt is provided which has the effect that the line of sealing between the cap and a container body neck is not situated at the bottom of the sealing skirt which typically provides for a low resiliency only, but rather distanced from this bottom, providing for a higher resilience of the sealing skirt.

The objective is also solved by a container body for interaction with a screw cap as described above, wherein the container body comprises at least two first protrusions and at least one second protrusion on an external surface of its neck. The first protrusions are capable of interacting with the first locking section and the second protrusion is capable of interacting with the second locking section of the screw cap. The protrusions are arranged at an angular separation with respect to one another, such that the angular separation of the protrusions of the container body substantially corresponds to the angular separation of the first and second locking sections of the screw cap.

It is preferred that the protrusions of the container body are angularly separated from one another preferably such that the angular separation of the protrusions substantially corresponds to the angular separation of the first and second locking sections of the screw cap. The advantages of an angular separation are that the tamper evidence member being triggered by the second locking sections works more reliably. In the preferred embodiment where the angular separation of the protrusions substantially corresponds to the angular separation of the first and second locking sections of the screw cap, the tamper evidence member is immediately triggered when the childproof lock is overridden due to the fact that the inward deformation of the screw cap at the second angular position of the screw cap, namely the positions of the second locking sections, is necessary to override the childproof lock and, at the same time, triggers the tamper evidence member.

A container according to the invention comprises a container body and a screw cap being described above. The container body comprises at least three protrusions which are angular separated such that the angular position of each protrusion substantially coincides with an angular position of either a first or a second locking section of the screw cap. In a preferred embodiment, two of these at least three protrusions are, in the closed state, at the first angular position of the screw cap cooperating with the first locking sections which provide for the childproof lock. The at least one remaining protrusion is preferably arranged at the second angular position of the screw cap providing for the tamper evidence member being triggered on overriding the childproof lock.

Further, it is preferred that, when opening the cap, at least one of the first and second locking sections abuts at least one of the protrusions of the container body. There is, however, in the closed state still a play of about 5° to 10°. This means that the screw cap is locked in its closed state and, in order to turn the screw cap for opening the container, the first locking section is unlocked by locking the second locking section. In this embodiment, it is not possible to move the screw cap without overriding the childproof lock and/or activating the tamper evidence member.

Preferably, the outward radial deformation of the cap is such that none of the first locking sections does abut any of the protrusions of the container when the cap is turned. According to this preferred embodiment, the outward radial deformation unlocks the first locking sections and, accordingly, overrides the childproof lock of the container. Therefore, turning of the screw cap is possible and the container can be opened when the output radial deformation is achieved.

A container body being closable by a screw cap as described above comprises at least two protrusions on an external surface of the neck which are capable of cooperating with at least one of the first and second locking sections of the screw cap. Preferably, the locking sections abut at least one of these two protrusions for either locking the screw cap and, accordingly, proving for a childproof lock, or for triggering the tamper evidence member when the childproof lock is overridden and the screw cap is turned. Accordingly, it is preferred that at least one of the protrusions cooperates with either the first or second locking sections at any time, wherein the cooperation of the first locking sections with one of these protrusions can be overridden by an outward deformation of the screw cap which is achieved by an inward deformation at a different angular position of the screw cap which, accordingly, locks a second locking section with at least one remaining protrusion on the external surface of the neck of the container body.

The objective is also solved by a container comprising a container body as described above and a screw cap as described above.

In order to improve the efficiency of the manufacture of the screw cap, the following method also solves the objective. The method of fabricating a screw cap as described above comprises the steps of injecting a material into a mould comprising at least an undercut in the form of a thread, opening the mould to expose the outside of the screw cap, linearly retracting at least one portion of the mould from the inside of the screw cap in order to expose the undercut portion of the screw cap to allow for a radial movement, forcibly ejecting the screw cap from a core portion of the mould, thereby resiliently expanding the undercut section.

As can be easily seen, this method dispenses with the necessity of having a turnable screw insert in order to form and demould a thread in the cap. This highly improves the speed of demoulding and the mould itself can be made more compact.

In a preferred variant, at least a first portion and a second portion of the mould are linearly retracted from the inside of the screw cap.

In order to provide for a reliable and strong guidance of the cap during demoulding, and in particular for avoiding any shifting around or tilting of the cap during demoulding, the cap is guided on a central pin that preferably sits in the desiccant chamber. In this manner, a reliable demoulding can be achieved when forcibly ejecting the cap from the mould.

BRIEF DESCRIPTION OF THE DRAWINGS

Further features and advantages of the invention will become clear from the following detailed description of the Figures in which FIG. 1 is a perspective bottom view of the screw cap according to an embodiment, showing the inside of the screw cap;

FIG. 2 is a perspective view showing the outer topside of the screw cap of FIG. 1;

FIG. 3 is a perspective view showing the screw cap according to FIGS. 1 and 2 from the bottom side;

FIG. 4 is a perspective side view of a container body onto which the screw cap shown in FIGS. 1 to 3 may be screwed;

FIG. 5 is a perspective sectional view of a container comprising the container body shown in FIG. 4 and the screw cap shown in FIGS. 1 to 3;

FIG. 6 is another perspective sectional view of the container of FIG. 5;

FIGS. 7 to 10 show schematically the demoulding of a screw cap;

FIGS. 14 and 15 show a different embodiment of a resilient screw section;

FIGS. 16 and 17 show the concept of a spacer rib;

DETAILED DESCRIPTION OF A PREFERRED EMBODIMENT

Figure 8:
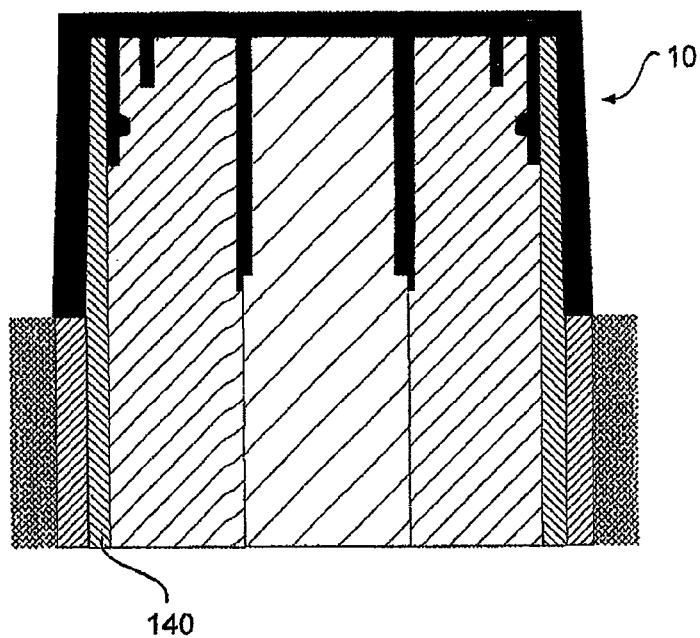

In the following, a screw cap 10, a container body 40 and a container 60 is described as an exemplary but preferred embodiment.

FIGS. 1 to 3 show the screw cap 10 according to the embodiment. The screw cap 10 comprises a substantially circular front side wall 12 and a substantially cylindrical peripheral wall 14 which together constitute the outer appearance of the screw cap 10.

A substantially cylindrical screw section 17, which is, in this embodiment, composed of two distinct skirt portions 17.1 and 17.2, is provided radially inwardly from the peripheral wall 14. Each of the skirt portions 17.1 and 17.2 carries a section of a screw thread 16, namely thread sections 16.1 and 16.2. The screw section 17 is intended to provide the locking engagement between the respective thread sections 16.1 and 16.2 of the screw cap 10 and the container body 40 shown in FIG. 4 and as explained below. The screw section 17 is radially resilient due to its specific design.

Each of the thread sections 16.1 and 16.2 covers almost a half-circle, namely about 170°, but the thread sections 16.1 and 16.2 are nevertheless spaced apart from one another. Accordingly, the thread 16 of the thread section 17 is comprised of two distinct thread sections 16.1 and 16.2 on two distinct skirt portions 17.1 and 17.2, each.

It should be understood that more than two distinct skirt portions and thread sections could also be used in order to provide the thread section, in particular three distinct skirt portions. Combinations of different design options help to adjust the level of resilience achieved.

The provision of the distinct thread sections 16.1 and 16.2 leads to a situation in which the demoulding of the screw cap can be carried out relatively easily as a separate insert for a full thread can be dispensed with and the step of unscrewing the mould for the thread can be avoided. In other words, by the separation of the thread into different sections, the design of moulding tools which enable forming and demoulding of the screw cap by forcible ejection, i.e. without turning any inserts, can be achieved.

The provision of the distinct skirt portions 17.1 and 17.2 has basically the same effect. In this case, the skirt portions 17.1 and 17.2 can also be made such that they are radially resilient which further improves the demoulding characteristics of the screw cap.

It is contemplated using a full, but resilient, skirt instead of the distinct skirt sections and provide the thread on this resilient skirt in order to achieve the advantageous effects with respect to the demoulding process.

In order to provide a childproof locking mechanism, a first locking section in the form of two protrusions 20.1, 20.2 are formed in the peripheral wall 14 which are intended to interlock with corresponding sections of the container body described below. The protrusions 20.1 and 20.2 are situated in diametrically opposed positions on the peripheral wall 14.

Furthermore, the protrusions 20.1 and 20.2 are formed having one steep shoulder and one flat shoulder wherein the steep shoulder is intended to provide the locking function in the rotation direction for opening the screw cap, and the flat shoulder enables a closing rotation of the screw cap.

As will be explained below with respect to the container, the childproof locking mechanism can be overridden by squeezing or pressing onto the peripheral wall 14 of the screw cap at a position preferably rotated by 90° to the positions of the protrusions 20.1 and 20.2. This squeezing or pressing of the screw cap 10 results in a deformation of the peripheral wall 14 and, thus, in an extension of the distance between the protrusions 20.1 and 20.2.

Axially adjacent to the peripheral wall 14 and opposite the front side wall 12 there is provided a tamper evidence mechanism in the form of a tamper evidence band 18 having a ring shape and is connected to the peripheral wall 14 of the screw cap by means of frangible webs 32. The tamper evidence band 18 is best seen in FIG. 3 and comprises a second locking section in the form of protrusions 22.1 and 22.2 which protrude inwardly from the inner face of the tamper evidence band 18. The protrusions 22.1 and 22.2 also comprise a flat shoulder and a steep shoulder in the same manner as the protrusions 20.1 and 20.2 described above with respect to the childproof locking mechanism.

Accordingly, when the screw cap 10 is turned in one direction (anti-clockwise in FIG. 1) any protrusion on the neck of a container body which is shown in FIG. 4 can be easily overridden by the protrusions 20.1, 20.1, 22.1 and 22.2, whereas turning of the screw cap in the other direction (clockwise in FIG. 1) results in locking of the respective protrusions with respective other protrusions on the neck of a container as the respective steep shoulders of the protrusions abut against the respective protrusions on the container body.

As is evident from the Figures, in particular FIGS. 1 and 3, the protrusions 20.1 and 20.2 of the childproof locking mechanism are situated radially rotated to the protrusions 22.1 and 22.2 of the tamper evidence mechanism by about 90°. This has the effect that upon squeezing the peripheral wall 14 in order to unlock the childproof locking mechanism, the protrusions 22.1 and 22.2 of the tamper evidence mechanism are inevitably brought into a close locking relation with the respective protrusions on the container body. Accordingly, when opening the screw cap 10, the frangible webs 32 are inevitably destroyed and the tamper evidence mechanism is highly reliable.

FIG. 2 shows a perspective view of the screw cap 10 from the outside of it. This Figure shows the peripheral wall 14 and the tamper evidence band 18 more clearly wherein the tamper evidence band 18 is connected to the peripheral wall 14 by a couple of frangible webs 32 such that the tamper evidence band 18 can easily be removed from the peripheral wall 14.

Further, FIG. 2 shows the outer face of the substantially cylindrical front side wall 12 which shows two indications 28.1, 28.2 in the form of a triangle pointing towards the cylinder axis of the screw cap 10, namely the centre of the front side wall 12, indicating the direction and position where the squeezing pressure for opening the container is to be applied. Further, the surface of the front side wall comprises an indicator 30 indicating a turning direction for the screw cap 10 for opening a container which is closed by the screw cap 10.

At the angular positions of the indications 28.1, 28.2 which are opposed to one another there are two surfaces 26.1, 26.2 which accordingly are also diametrically opposed to one another. Pressing on these surfaces 26.1, 26.2 by a user deforms the screw cap 10 inwardly at these angular positions whereas as a result the screw cap 10 is radially outwardly deformed at angular positions being substantially perpendicular to those of the indications 28.1, 28.2 and the surfaces 26.1, 26.2, respectively. Therefore, by pressing the surfaces 26.1, 26.2 towards the centre of the crew cap 10, namely into the direction indicated by the triangular indications 28.1, 28.2, the screw cap 10 is squeezed and deformed from a substantially circular cross-section of the peripheral wall 14 into a substantially elliptical cross-section of the peripheral wall 14.

The angular position of the indications 28.1, 28.2 and the surfaces 26.1, 26.2 correspond to an angular position which is perpendicular to the angular position of the protrusions 20.1, 20.2 of the childproof locking mechanism shown in FIG. 1. Accordingly, the protrusions 22.1 and 22.2 shown in FIG. 1 which are provided on the tamper evidence band 18 angularly coincide with surfaces 26.1, 26.2 or indications 28.1, 28.2, respectively, since the protrusions 20.1, 20.2 in FIG. 1 have an angular perpendicular position with respect to the protrusions 22.1 and 22.2.

FIG. 3 shows a different perspective view of the screw cap 10 at least partly showing the screw cap 10 from below, namely showing its inside parts. Accordingly, FIG. 3 shows the protrusion 20.1 being part of the peripheral wall 14 and the second protrusions 22.1 and 22.2 being part of the tamper evidence band 18. Further, FIG. 3 shows the frangible webs 32 connecting the tamper evidence band 18 with the peripheral wall 14 of the screw cap 10.

The screw cap 10 furthermore comprises a desiccant chamber 24 which is attached at the centre of the circular front side wall 12 and which is substantially formed by a rather rigid cylindrical skirt protruding 12 towards the inside of a container being closed by the screw cap 10. In other words, the desiccant chamber extends substantially in the same direction as the peripheral wall 14.

The axial extension of the desiccant chamber may exceed the axial extension of the peripheral wall 14. The desiccant chamber 24 is cylindrically shaped with its cylinder axis being aligned with the cylinder axis of the screw section 17.

FIG. 4 shows a container body 40 which is closable by the screw cap 10 shown in FIG. 1-3. The container body 40 comprises a neck 44 having a full thread 42 on it. The neck 44 and the screw thread 42 of the container 40 are commonly known in the art.

The container body 40 comprises two additional protrusions 46.1, 46.2 on the neck as well as further protrusions 48 which are more distantly arranged from the open end of the container body 40 with regard to the first protrusions 46.1, 46.2. The further protrusions 48 are placed within a groove 54 wherein the groove 54 sits on a shoulder of the housing part 50 of the container body 40. A circumferential collar 52 around the neck 44 of the container body 40 is also provided.

The two protrusions 46.1, 46.2 which are arranged on the neck 44 of the container body 40, are diametrically arranged with respect to one another and comprise at least one steep shoulder opposing the opening direction for a screw cap being screwed onto the container body 40. The further protrusions 48 are likewise formed having one steep shoulder and one flat shoulder such that any protrusion moving in an opening turning direction (counter-clockwise in FIG. 4) abuts the steep shoulder of the protrusion 48 whereas a protrusion moving in the opposite direction can slide along the flat shoulder of the protrusion 48.

The angular positions of the protrusions 46.1, 46.2 and the further protrusions 48 are corresponding to the angular positions of the first protrusions 20.1, 20.2 and the second protrusions 22.1 and 22.2 of the screw cap 10. In other words, the two protrusions 46.1, 46.2 on the neck of the container body 40 are diametrically arranged whereas the angular positions of the further protrusions 48 is substantially perpendicular to the angular positions of the first protrusions 46.1, 46.2.

Therefore, a screw cap 10 being screwed onto the container body 40 comprises first and second protrusions 20.1, 20.2, 22.1, 22.2, which in the closed state coincide in their angular positions with the first and second protrusions 46.1, 46.2, 48 of the container body 40. Furthermore, the shapes of the protrusions 20.1, 20.2, 22.1, 22.2, 46.1, 46.2, 48 is such that when turning the screw cap 10 in the closing direction, the flat shoulders of the protrusions contact each other and can slide with respect to each another whereas on turning the screw cap 10 in the opening direction, the steep shoulders of the protrusions abut each other exerting a force on the elements provided with the protrusions. Accordingly, the protrusions 20.1, 20.2 of the screw cap 10 provide for a first locking section whereas the second protrusions 22.1 and 22.2 of the screw cap 10 being provided on the tamper evidence band 18 provide for a second locking section when the above mentioned protrusions cooperate with the further protrusions on the container body 40.

FIG. 5 shows a perspective view of a container 60 comprising a container body 40 as shown in FIG. 4 and a screw cap 10 as shown in FIG. 1-3. The screw cap 10 is screwed onto the container body 40 such that the container 60 is in its closed state. As can be seen on the right hand side of the neck 44 of the container body 40, the protrusion 46.1 and the first protrusion 20.1 of the screw cap 10 abut each another. Therefore, turning of the screw cap 10 with respect to the container body 40 cannot be performed because the first protrusion 20.1 locks the screw cap 10 in its function as first locking section. Pressing on the peripheral wall 14 at an angular position indicationed by the indication 28.1 will deform the peripheral wall 14 such that the first protrusion 20.1, namely the first locking section moves radially outwardly and is unlocked with the protrusion 46.1.

In this manner, the screw cap 10 can be turned and removed from the container body 40. However, at the same time the second locking section which is provided by the second protrusions 22.1 and 22.2 on the tamper evidence band 18 which are abutting on the further protrusions 48 on the container body 40 make sure that the webs 32 between the tamper evidence band 18 and the peripheral wall 14 are destructed, leaving the tamper evidence band 18 in the groove 54 of the container body 40. Thereby, an initial opening of the container 60 is indicated by the tamper evidence band 18 being separated from the screw cap 10.

FIG. 5 shows a portion of the screw section 17.1 being radially separated from the peripheral wall 14. This figure clearly shows that the screw section is substantially cylindrically shaped (in case of two portions such as in the embodiment described herein substantially half-cylindrically shaped) having a smaller diameter than the peripheral wall 14 enclosing the screw section.

FIG. 6 shows the sectional perspective view of FIG. 5 from a different perspective. Thereby, FIG. 6 shows the indication 28.1 as well as the respective surface 26.1 for radially inwardly deforming the peripheral wall 14 of the screw cap 10 more clearly and further illustrates how to open the container 60.

FIGS. 7 to 10 show an exemplary and stepwise demoulding process for the screw cap of the embodiments.

The screw cap 10 sits, substantially with all features discussed above, in particular the circular front side wall 12, the substantially cylindrical peripheral wall 14, the screw section 17 with screw thread 16, additional sealing skirt 19 and desiccant chamber 24, in a mould generally indicated by reference numeral 100. The mould has an outer section 110 and a basis 120, which are clamped together by a clamping force suitable for the respective injection apparatus.

Several pins are provided in order to form the inside of the screw cap 10, wherein the basis of the mould 100 includes a central pin 130, a first pin 140 and a second pin 150. In order to clarify the demoulding process, FIGS. 7 to 10 show the different moulding steps.

In FIG. 7 the outer section 110 of the mould 100 is still present. In FIG. 8 this outer section 110 is removed, such that the outside of the screw cap 10 is exposed. Preferably, a slight demoulding angle is present in order to easily remove the outer section 110.

Figure 9:
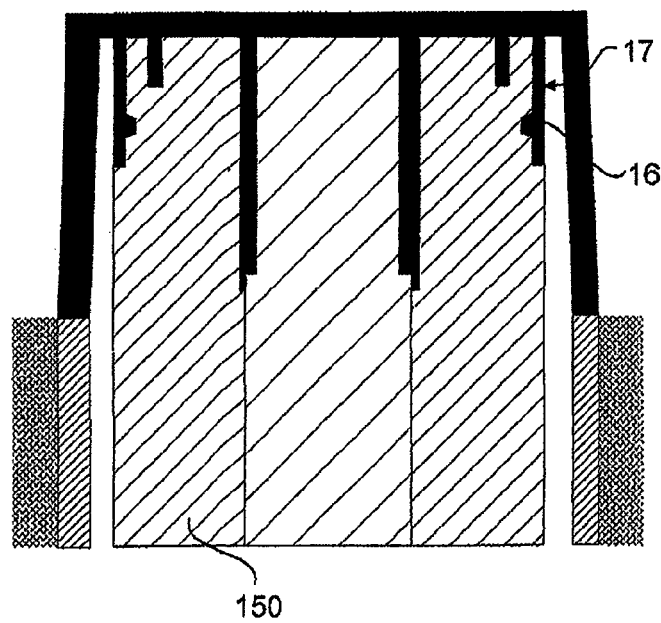

As the next step, the first pin 140 is retracted from the inside of the cap, as shown in FIG. 9. The retraction of this first pin 140 has the effect that the screw section 17 including the thread 16 can be bent outwardly by an radially resilient bending when the second pin 150 is retracted and the screw section is bent due to the undercut generated by the thread 16.

Figure 10:
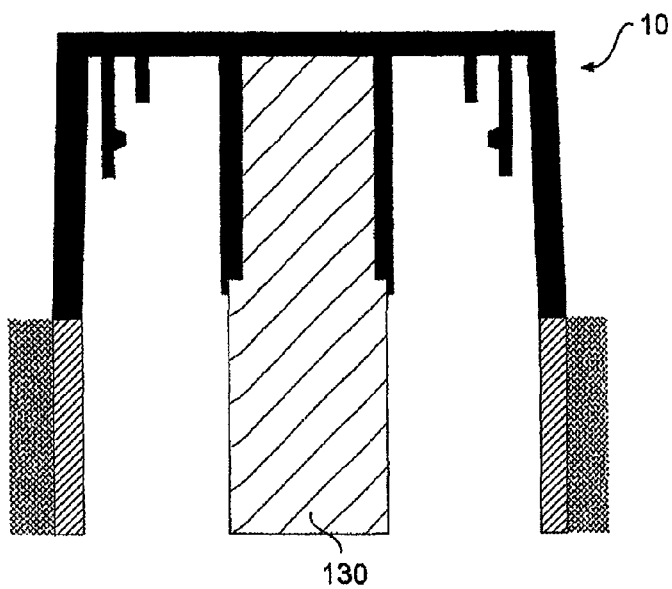

FIG. 10 shows the position in which only the central pin 130 is still present and the finished and demoulded cap can be forcibly ejected.

Accordingly, to sum up, the sequence of demoulding is basically as follows: in a first step, the mould 100 is opened by removing outer section 110. In a second step, the first pin 140 is retracted in order to allow for a space to resiliently deform the screw section 17 at the undercut. The resilient deformation takes then place in the third step, in which the second pin 150 is retracted and, due to the presence of thread 16, the screw section 17 needs to be bent resilientaly to the outside and, thus, bends over the undercut. As the fourth step, the then manufactured cap is ejected.

This sequence of opening the mould 100 has a number of advantages over the demoulding process used in the art, in particular, this demoulding process provides for an improved reliability as to the moisture tightness of the cap. This is in particular due to the fact that the risk for scratching the sealing skirt 19 as well as the screw section 17 is reduced, as there is no rotational friction with the mould core, which would be the case if a traditional screw insert would be used.

In addition to that, an increased design freedom for the screw section 17 as well as the sealing skirt 19 can be achieved and, for example, an olive-shaped skirt or any other non-circular skirt could be realized, which would not be possible when using the traditional process step of unscrewing the core.

The sealing skirt 19 can be extended to any dimension as the step of unscrewing an inner screw section is dispensed with. When unscrewing an inner insert, the length of the sealing skirt 19 is restricted due to the friction of the core 130 with this skirt in order not to damage it.

The distance between the circular front side wall 12 and the sealing line can be adjusted, e.g. by ribs 11 inside of the cap, such that the opening torque for the screw cap becomes less dependent on the manufacturing tolerances.

Furthermore, as a screw insert is not to be used anymore and the feature of the turning of this screw insert can be dispensed with, the mould design is more compact and, for the same size of a screw cap, a smaller injection machine can be used. In particular, when using the unscrewing inserts, the restrictive criteria for selecting the appropriate size of the injection moulding machine is typically the size of the mould but not the clamping force related to the front surface of the moulded items.

In addition to that, due to the more compact mould, the core of the mould can be cooled better, which results in savings as to the cycle time.

Figure 11:
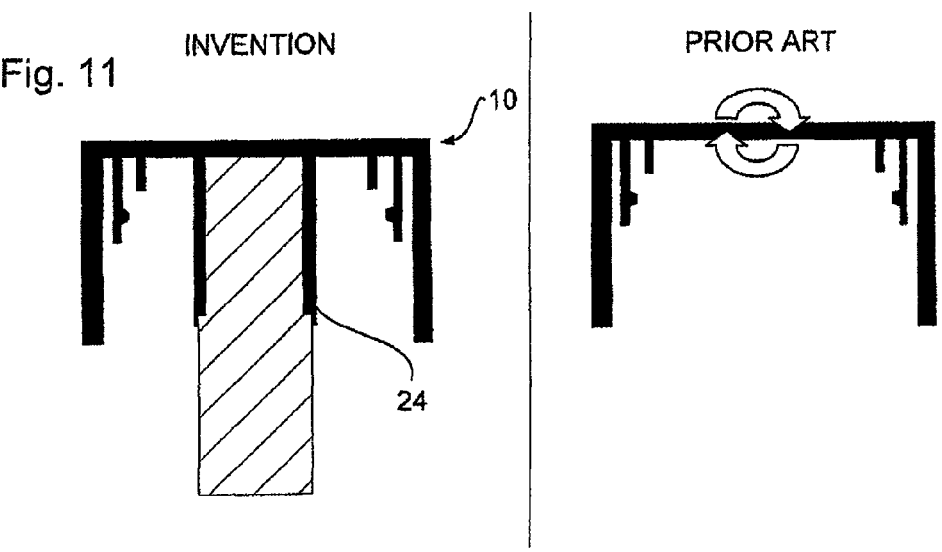
FIGS. 11 and 12 show the mechanism of guidance by the desiccant chamber.

When looking at FIG. 11, it becomes apparent that the provision of the desiccant chamber 24 in the center of the screw cap 10 is an important feature, also for the mould process. In particular, when retracting the core pin 130, the cap is still guided at the desiccant chamber, which prevents the cap from shifting around in the cavity, which results in a better control of the thread geometry and reduces the risk of damaging, stretching or scratching the sealing skirt, which could, otherwise, compromise the sealing properties of the cap 10.

Figure 12:
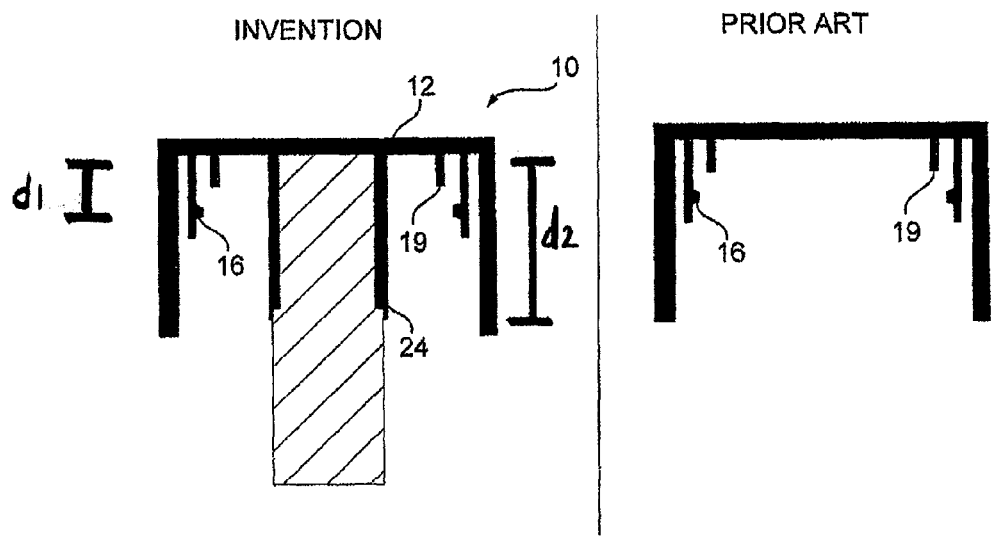

This guidance of the cap 10 by means of the desiccant chamber 24 becomes in particular relevant when certain dimensions are met, in particular the dimensions shown in FIG. 12. Here, the distance d1 is the distance between the inside face of the front side wall 12 of the cap 10 and the thread 16 and d2 is the length of guidance that can be provided by the desiccant chamber 24. Preferably the inequation d2>d1 is valid, preferably d2 is at least equal to 0.8×d1. In this manner, a reliable and balanced ejection without damaging any parts that are crucial for the sealing properties of the screw cap can be carried out.

In a cap according to the prior art, the sealing skirt 19, which will then be used as a guiding means, is substantially smaller than the distance between the axially outer part of thread 16, leading to a situation in which the screw cap would tilt or otherwise shift around during the demoulding process.

A proper guiding of the cap in the mould is, however, essential for a high demoulding quality and, thus, for a high moisture tightness of the screw cap.

Figure 13:
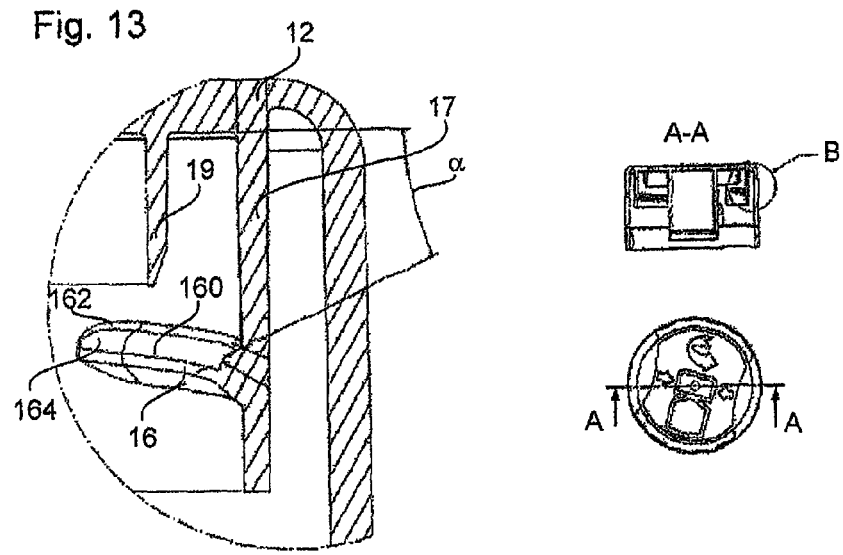
FIG. 13 shows a specific embodiment of a thread suitable to be forcibly ejected.

In another aspect of the present disclosure, FIG. 13 shows the different properties of thread 16, which provide a specific geometry of thread 16 in the light of the actual demoulding process. In particular, the inner part 160 of thread 16, which is, indeed, the undercut section, which induces the resilient deformation of screw section 17, is designed in a very specific way, which enables an unproblematic and smooth demoulding when retracting second pin 150 as shown in FIGS. 9 and 10, and including the bending of screw section 17.

In particular, a specific, but not limiting example is shown in FIG. 13, in which an inner radius 162, which boarders onto screw section 17, has a radius of 0.3 mm and the outer radius 164 of thread 16 has a radius of 0.8 mm.

The whole width or depth of thread 16 is likewise 0.8 mm. In combination with a width of the screw section 17 of about 1 mm at the top towards the circular front side wall 12 and 0.8 mm at the bottom of the screw section 17 and also in combination with an angle α of about 25°, which characterizes a demoulding angle of the undercut, the overall undercut is reduced and the angled and rounded sections of the thread provide for a smooth demoulding when retracting the second pin 150 of FIGS. 9 and 10.

FIG. 14 shows yet another variant of the embodiments of the present application, showing a separate skirt as the screw section 17, which is provided together with the tamper evidence member 18 and desiccant chamber 24 in screw cap 10.

This inner skirt as the screw section 17 can be adjusted as to its radial resiliency for any cap material by adjusting the length and/or the thickness of this skirt. Additional flexibility can be achieved by providing a discontinuous skirt as shown in FIG. 15, in which a first skirt section 71 and a second skirt section 72 are shown.

The attachment of thread 16 on a separate skirt allows using less resilient materials such as HDPE or PP in place of the LDPE, which is conventionally used when producing caps using forcible ejection of threads.

The design with a thread on the separate skirt allows adjustment of the radial resiliency of the strips without influencing the outside shape of the cap and, thus, enables having a screw cap which has an outer appearance, which can be shaped according to the customer's needs.

This attachment of the thread to a separate skirt also allows combining a very rigid design of the outer wall with the advantages of an resilient thread release in the form as described with respect to FIGS. 7 to 10.

In addition, the outer diameter of the cap itself, in particular the outer diameter of outer wall 14 is not limited by the thread.

Figure 17:
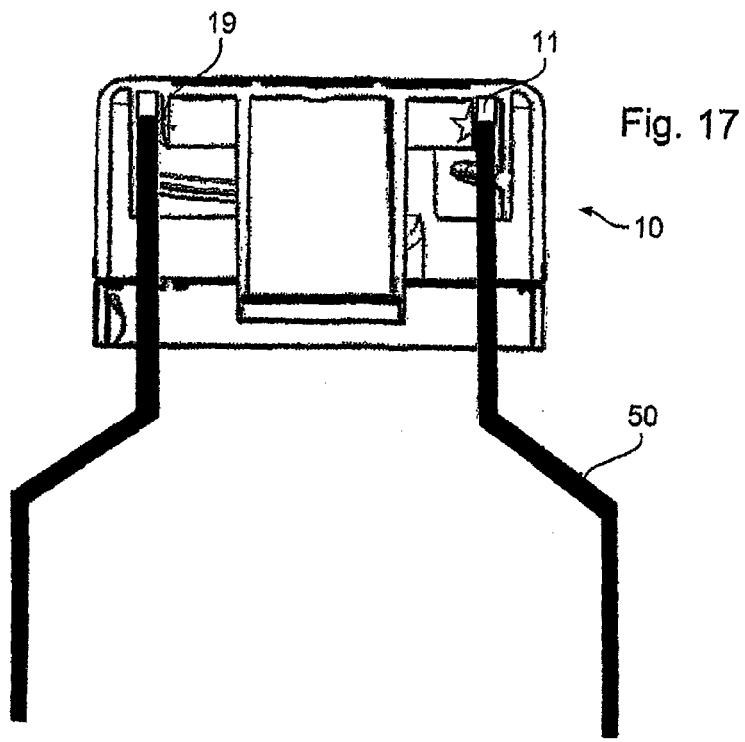

When considering the disclosure in FIGS. 16 and 17, it becomes clear that spacer ribs 11 for an improved flexibility of the sealing skirt 19 can also be provided, as can be derived from FIG. 17, in which the spacer ribs 11 are shown.

By means of the provision of the spacer ribs 11, the end of the screwing motion and, thus, the final seat of the cap 10 on the container body 50, can be achieved such that the sealing line is not situated at the bottom of the sealing skirt 19, as shown in FIG. 16, but rather in a position, as shown in FIG. 17, in which the sealing skirt 19 has still some flexibility. Accordingly, the tightness is improved and the opening torque that has to be applied to the cap 10 is less dependent on the manufacturing tolerances.

The provision of these ribs 11 is only possible if no screw insert is used, but if the demoulding process as described with respect to FIGS. 7 to 10 can be used.

Figure 18:
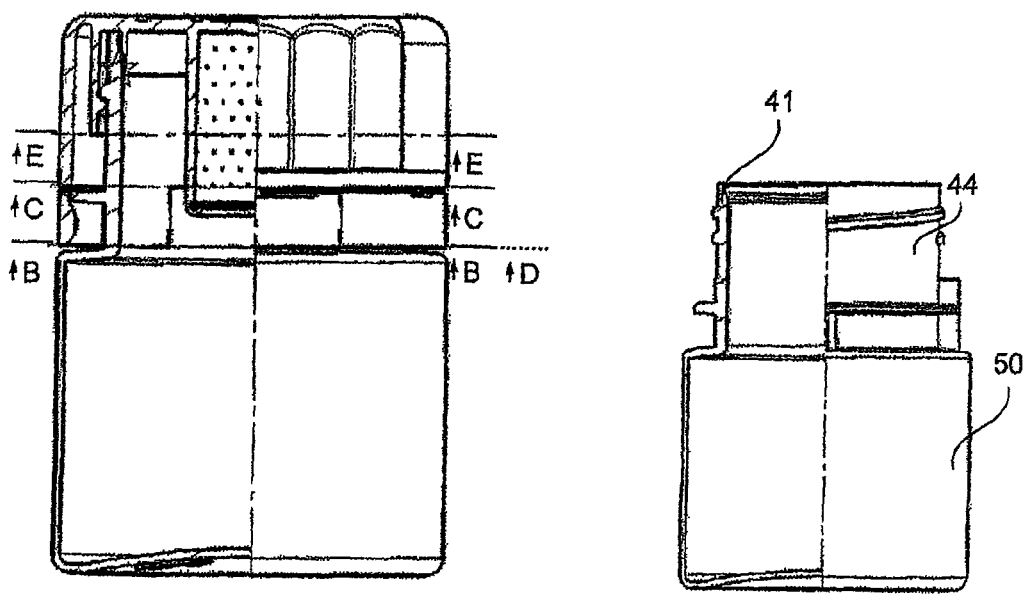
FIG. 18 shows the concept of an alternative container body having improved sealing properties.

FIG. 18 shows an alternative to this concept, in which the container body 50 is provided at its neck 44 with a specific area of reduced wall thickness, indicated by reference numeral 41, which likewise serves as a spacer between the bottom of the sealing skirt and provides a sealing line which sits above the bottom part.

Figure 19:
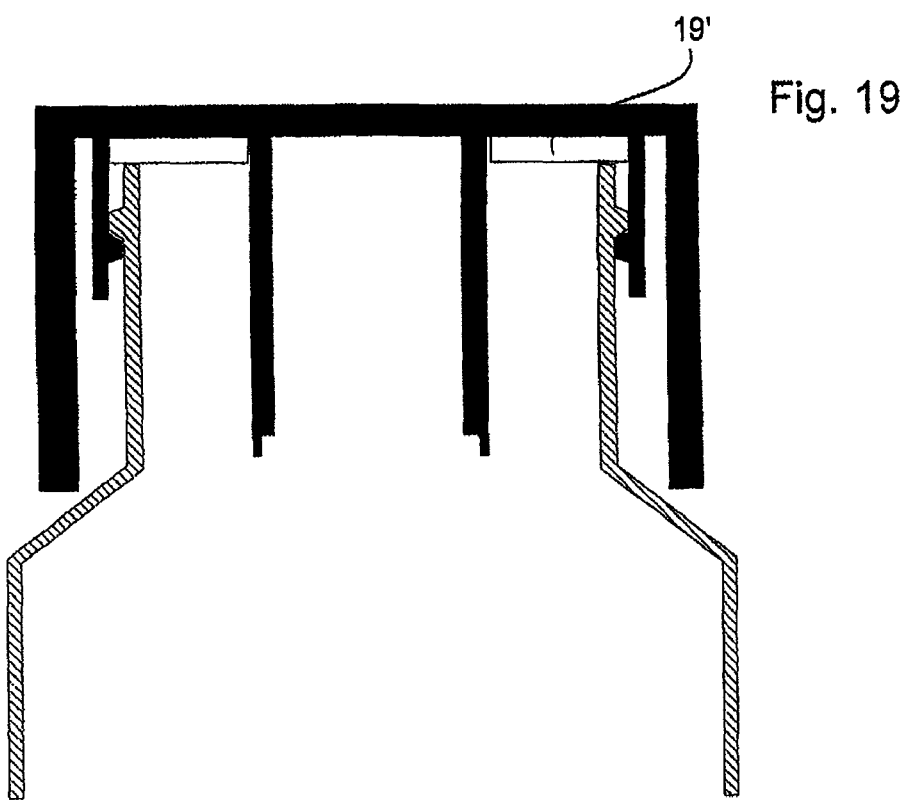
FIG. 19 shows yet another concept of reliably sealing the container.

FIG. 19 shows yet another alternative in which a flat seal 19' is provided as an alternative to the sealing skirt 19 disclosed in the Figures before. This flat alternative seal may have advantages as to the sealing tightness that can be achieved.

The invention claimed is:

1. A container comprising a screw cap, screwed onto a neck of a container body, wherein the screw cap comprises
    a substantially cylindrical screw section comprising a screw thread on its inner face;
    at least one tamper evidence member for indicating an initial opening of the screw cap; and
    a desiccant chamber located radially inwardly to the screw section;
    wherein the screw section is radially resilient, and
    wherein the screw cap further comprises at least one childproof locking member including a first locking section, wherein a tamper evidence member comprises at least one second locking section, and the first locking section and the second locking section are angularly separated from one another.

2. The container of claim 1, wherein the screw section of the screw cap is dimensioned to achieve the radial resiliency.

3. The container of claim 1, where the screw cap further comprises a peripheral wall, wherein the screw section is situated on a screw skirt radially outwardly of the desiccant chamber and radially inwardly of the peripheral wall of the screw cap.

4. The container of claim 3, wherein the screw skirt of the screw cap is dimensioned to be radially resilient.

5. The container of claim 1, wherein the screw thread of the screw cap is provided by at least two distinct thread sections located in the screw section.

6. The container of claim 1, wherein a cross-section of the thread of the screw cap on the screw section is such that it supports forcible ejection.

7. The container of claim 1, wherein the childproof locking member comprises at least two first locking protrusions which are substantially diametrically arranged.

8. The container of claim 1, wherein the first and second locking sections are arranged at an angular separation of about 15° to about 155°.

9. The container of claim 1, wherein (d2)>(d1) of the screw cap, wherein (d2) is an axial length of the desiccant chamber and (d1) is an axial distance between an outmost thread portion and a circular front wall section of the cap.

10. The container of claim 1, wherein the screw cap further comprises a sealing skirt situated radially inwardly from the screw section and radially outwardly from the desiccant chamber, which sealing skirt has a non-cylindrical shape.

11. The container of claim 10, wherein the screw cap further comprises at least one spacer situated between the screw section and the sealing skirt.

12. The container of claim 1, wherein the container body further comprises at least two first protrusions and at least one second protrusion on an external surface of its neck, wherein the first protrusions is capable of interacting with a first locking section and the second protrusion is capable of interacting with a second locking section of the screw cap, and
    wherein the protrusions are arranged at an angular separation with respect to one another, such that the angular separation of the protrusions substantially corresponds to the angular separation of the first and second locking sections of the screw cap.

13. A method of fabricating the screw cap of the container as described in claim 1, comprising the steps of
    injecting a material into a mould comprising an undercut in the form of a thread,
    opening the mould to expose an outside of the screw cap,
    linearly retracting at least one portion of the mould from an inside of the screw cap in order to expose at least one side of an undercut portion of the screw cap to allow for a radial deviation, and
    forcibly ejecting the screw cap from a core portion of the mould, thereby resiliently expanding an undercut section.

14. The method of claim 13, wherein at least a first portion and a second portion of the mould are linearly retracted from the inside.

15. The method of claim 13, wherein the cap is guided during the forcible ejection on a central pin in an area of a desiccant chamber of the cap.

16. A container comprising a screw cap, screwed onto a neck of a container body, wherein the screw cap comprises
    a substantially cylindrical screw section comprising a screw thread on its inner face;
    at least one tamper evidence member for indicating an initial opening of the screw cap; and
    a desiccant chamber located radially inwardly to the screw section;
    wherein the screw section is radially resilient;
    wherein the screw cap further comprises a peripheral wall, wherein the screw section is situated on a screw skirt radially outwardly of the desiccant chamber and radially inwardly of the peripheral wall of the screw cap, and
    wherein the screw skirt of the screw cap comprises at least two distinct skirt sections.

17. The container of claim 16, wherein (d2)>(d1) of the screw cap, wherein (d2) is an axial length of the desiccant chamber and (d1) is an axial distance between an outmost thread portion and a circular front wall section of the cap.

18. The container of claim 16, wherein the screw cap further comprises a sealing skirt situated radially inwardly from the screw section and radially outwardly from the desiccant chamber, which sealing skirt has a non-cylindrical shape.

19. The container of claim 16, wherein the screw cap further comprises at least one childproof locking member including a first locking section, wherein a tamper evidence member comprises at least one second locking section, and the first locking section and the second locking section are angularly separated from one another.

20. The container of claim 16, wherein the screw skirt of the screw cap is dimensioned to be radially resilient.

* * * * *